United States Patent [19]

McCabe

[11] Patent Number: 5,060,695
[45] Date of Patent: Oct. 29, 1991

[54] BYPASS FLOW PRESSURE REGULATOR

[75] Inventor: Ralph P. McCabe, Troy, Mich.

[73] Assignee: Coltec Industries Inc, New York, N.Y.

[21] Appl. No.: 502,897

[22] Filed: Apr. 2, 1990

[51] Int. Cl.[5] .................. F15B 5/00; F16K 11/07; F16K 31/02; G05D 16/00

[52] U.S. Cl. ..................... 137/625.61; 137/625.65

[58] Field of Search ................ 137/625.61, 625.64

[56] References Cited

U.S. PATENT DOCUMENTS

| 2,896,588 | 7/1959 | Hayner et al. | 137/625.61 |
| 3,789,735 | 2/1974 | Tam et al. | 137/625.65 |
| 3,856,047 | 12/1974 | Takayama | 137/625.64 X |
| 4,538,643 | 9/1985 | Goedecke et al. | 137/625.64 |
| 4,674,613 | 6/1987 | Sikorski | 137/625.64 X |

FOREIGN PATENT DOCUMENTS 1100189 3/1955 France .................. 137/625.61

Primary Examiner—Arnold Rosenthal
Attorney, Agent, or Firm—Howard S. Reiter

[57] ABSTRACT

A pressure regulating device regulates the pressure of a flowing medium and includes a stationary member. A movable armature is disposed axially from the stationary member for moving axially in relation to the stationary member. A coil is disposed about the stationary member and the armature and through which curernt flows for generating magnetic flux to create an attractive force to move the armature in relation to the stationary member. A housing is disposed about the coil and the stationary member and the armature for encasing the armature and the coil and the stationary member. At least one aperture is formed in the housing to allow a fluid medium to enter and exit the housing and to contact the armature. A means bleeds a portion of the fluid medium based on the current to the coil to control the output pressure to predetermined levels.

32 Claims, 4 Drawing Sheets $$P = K - I^2$$

BYPASS FLOW PRESSURE REGULATOR

BACKGROUND OF THE INVENTION

1. Field of the Invention

The present invention relates to fluid pressure regulators, and more particularly to a pressure regulator for regulating the fluid pressure in the transmission of an automotive vehicle.

2. Description of Related Art

Pressure control devices for use in a control system of an automatic transmission of a motor vehicle have been proposed in the past. For example, a typical pressure control device may include a housing encasing a magnetic coil and an armature control slide movable within a valve through which a pressure medium to be controlled passes.

A problem with some of these pressure control devices is that they are not resistant to contamination, which compromises their reliability. Another problem is that such devices are single-stage devices wherein a spool valve is in direct contact with (and moved by) the armature, which requires that the position of the spool must be indexed to that of the armature, which complicates the device. Also, the travel of the spool is limited by what the armature can accommodate. Still further, only magnetic forces are available to move the spool.

A main object of the invention is to provide a pressure control device that overcomes problems, such as those referred to above, exhibited by prior art devices.

Accordingly, in a pressure regulator contemplated by the invention, the spool valve is not connected to the armature. Instead, the armature operates a first stage poppet servo valve.

Further, servo pressure is determined by the force balance on the armature, and the resulting servo pressure force has to equal the sum of the magnetic force and a mechanical spring force.

Additionally, there is also a force balance on the spool valve, and the spool will move, changing control pressure until the control pressure plus spool spring force equals the servo pressure force.

Some of the advantages of a pressure regulator embodying the invention are as follows:

1. Large hydraulic forces are available to move the spool valve instead of low magnetic forces, which substantially improves response time and overcomes potential fouling.
2. Since the position of the spool valve is independent of the position of the solenoid armature, large flows can be accommodated without pressure variation due to changes in armature position.
3. Manufacturability is improved because there is no need to maintain a precise position between the armature and the spool valve and its ports.
4. Hydraulic flow forces do not enter into the armature force balance and therefore do not have a large effect on the regulation of the device.

These and other objects and advantages of the invention will become more apparent by reference to the following specification and the attached drawings.

SUMMARY OF THE INVENTION

A pressure regulating device for regulating the pressure of a flowing medium includes means forming a housing. A stationary member and moveable armature are disposed within the housing, and a coil means disposed about the stationary member and the armature receives current for generating magnetic flux to create an attractive force to move the armature in relation to the stationary member. At least one aperture is formed in the housing to allow a fluid medium to enter and exit the housing. A means is disposed in the housing for bleeding a portion of the fluid medium based on the current to the coil means to control the output pressure to predetermined pressure levels.

Accordingly, the subject invention provides a means for bleeding some of the pressure of the fluid medium to reduce the output pressure of the pressure regulating device to various predetermined pressure levels.

MORE DETAILED DESCRIPTION OF THE DRAWINGS

Figure 1:
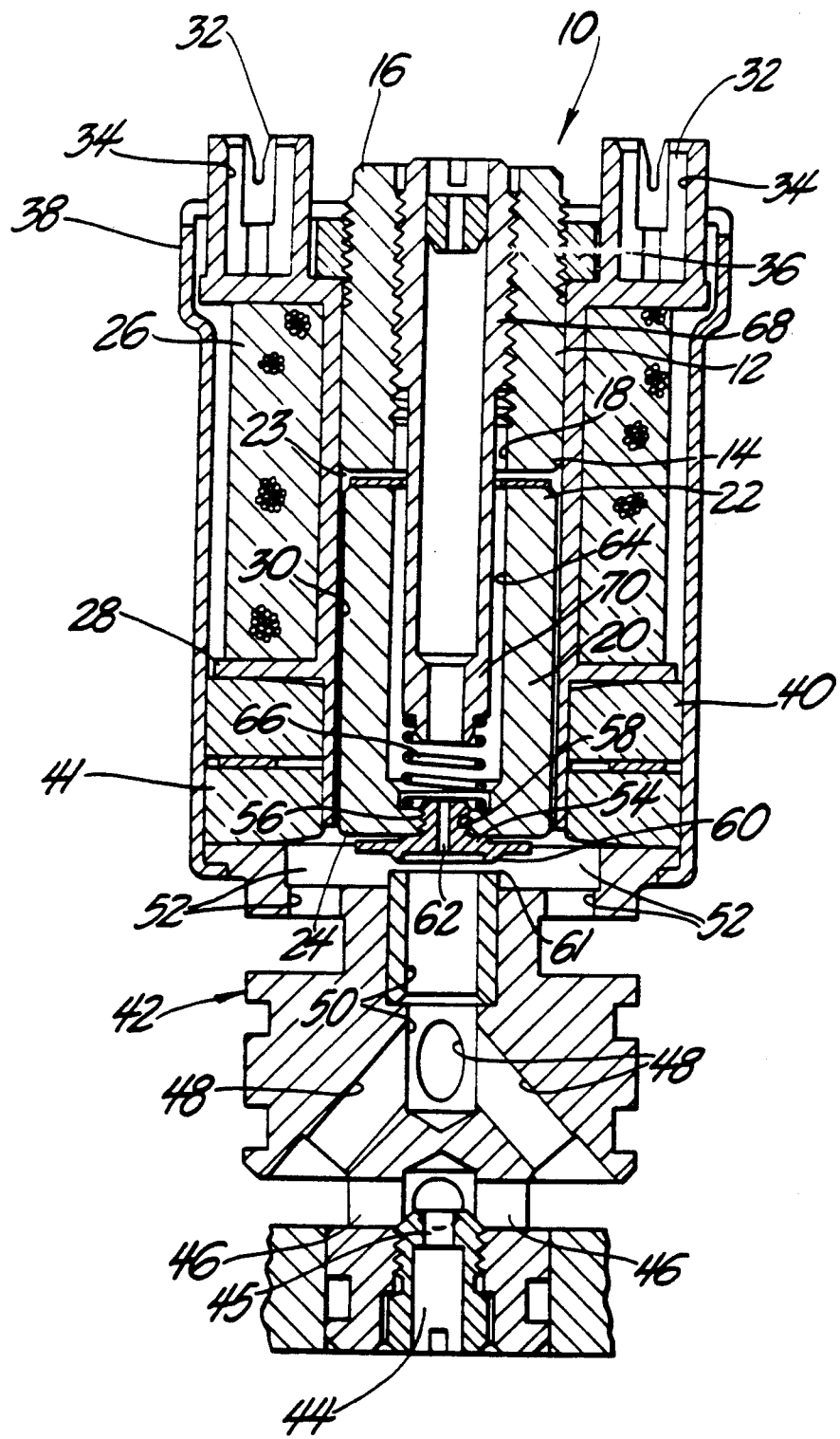
FIG. 1 is a cross sectional elevational view of a single-stage embodiment of the present invention.

A pressure regulating device for regulating the pressure of a flowing fluid medium is generally shown at 10 in FIG. 1. The device 10 includes a stationary generally cylindrical pole piece or member 12 having axially opposed ends 14 and 16. The stationary member 12 also includes a passageway 18 communicating axially therethrough.

The device 10 also includes a movable armature means disposed axially from the stationary member 12 for movement axially in relation to the stationary member 12. The armature means comprises a cylindrical shaped armature 20 having an open end 22 spaced axially from the end 14 of the stationary member 12. This creates a working gap 23 between the armature 20 and the end 14 of the stationary member 12. The working gap 23 defines the distance the armature 20 moves in relation to the stationary member 12. The armature 20 also includes a closed end 24 axially opposite the first end 22.

The device 10 further includes a coil means disposed partially about the stationary member 12 and the armature 20 and through which an electrical current flows from a source (not shown) for generating magnetic flux to create an attractive force to move the armature 20 in relation to the stationary member 12. The coil means comprises a solenoid coil 26. The current flowing through the solenoid coil 26 may be DC or the average value resulting from a chopped or pulse width modulated electrical supply. The attractive force is proportional to the current and the square of the number of turns of wire on the solenoid coil 26 and inversely proportional to the square of the distance 23 between armature 20 and the end 14 of the stationary member 12.

An annular U-shaped bracket member 28 is disposed partially about the stationary member 12 and armature 20, and the solenoid coil 26 is disposed within the bracket member 28, which forms a central passage 30 communicating axially through it. The armature 20 is slidably disposed in the passage 30 while the stationary member 12 is press-fitted into one end of the passage 30. A pair of connectors 32 are disposed in bores 34 formed in the bracket member 28 and connected to the solenoid coil 26 for attachment to an electrical supply source to allow electrical current to flow to the solenoid coil 26.

A return member 36 is threadably engaged and disposed about one end of the stationary member 12 and abuts one end of the bracket member 28. The return member 36 creates a closed flux loop by allowing magnetic flux to flow from the solenoid coil 26 through the bracket member 28 and return member 36 to the stationary member 12 and across the working gap 23 to the armature 20 back to the solenoid coil 26.

The device 10 includes a housing means encasing the armature 20, solenoid coil 26 and stationary member 12. The housing means comprises an annular casing 38 about the device 10 to prevent undesired or foreign contaminants from entering the device 10, and it also includes a pair of annular seals 40 and 41 at one end of the bracket member 28 to prevent fluid contaminants from contacting the solenoid coil 26.

The device 10 further includes a valve housing, generally indicated at 42, with apertures formed therein to allow a fluid medium to enter and exit the valve housing 42 and to contact the armature 20. More specifically, valve housing 42 has at least first aperture or cavity 44 formed therein to allow the fluid medium to enter and at least one second aperture or cavity 46 formed therein communicating via restriction means with the first aperture 44 to allow the fluid medium to exit the valve housing 42. The valve housing 42 further has at least one aperture or cavity 48, formed therein and communicating with at least one of the second apertures 46, to allow the fluid medium to flow to a first internal passage 50 in the valve housing 42. The first internal passage 50 allows such fluid medium as flows from conduit or inlet means 44, through restriction means 45, passage means 46 and depicted diagonally disposed passage means 48, to, generally, the armature 20.

The valve housing 42 further includes at least one second internal chamber and means passage 52 communicating with the first internal passage 50 to thereby allow the fluid medium to flow from the first internal passage 50 to the sump (not shown) and bypass the fluid output of the device 10.

The device 10 further includes a bleed valve means spaced axially from one end and connected to the armature 20 for moving in unseen with the armature 20. The bleed valve means comprises a valve plate 54 having one end 56 threadably engaging an aperture 58 formed in the closed end 24 of the armature 20. The valve plate 54 has an axially spaced end 60 which operatively cooperates with the valve seat 61 of housing 42 to allow or block fluid flow through the first internal chamber and passage means 50 to the second internal passage 52. The valve plate 54 also includes an aperture 62 to allow a small predetermined amount of fluid to enter the cavity 64 of the armature 20.

From the above, it will be noted that it is important that the restriction 45 between cavities or passage means 44 and 46 (see also the equivalent restrictions 145, 245 and 345 in FIGS. 2, 3 and 4, respectively) work in conjunction with the variable restricting characteristics of the valving means, comprised of axially spaced end 60 of valve plate 54 and valve seat 61, to control the pressure in cavity or passage means 46.

The device 10 includes a biasing means for continuously biasing the valve plate 54 toward the valve housing 42. The biasing means comprises a spring 66 disposed within the cavity 64, formed in the armature 20, between an adjustment means 68 and the closed end 24 of the armature 20. The spring adjustment means 68 is disposed axially within the cavity 64 of the armature for controlling the force of the spring 66 on the armature 20 in relation to the face of the valve housing 42, and it comprises a threaded rod 68 threadably engageable with the stationary member or pole piece means 12 and having one end 70 disposed within the cavity 64 of the armature 20.

In operation, the device 10 controls output pressure in response to an electrical current by bypassing fluid flow from its inlet aperture 44 and second internal chamber and passage means 52 back to its sump (not shown). The device 10 receives electrical current from a power source through the connectors 32 leading to the solenoid coil 26. The solenoid coil 26 generates magnetic flux to create an attractive force between the armature 20 and the stationary member or pole piece means 12. When the armature 20 moves toward the stationary member 12 it moves the valve plate 54 away from the face of the valve housing 42 and away from cooperating valve seat 61 to open the flow path from the first internal passage 50, which is in effect receiving inlet pressure, to the second internal chamber and passage means 52, thereby bypassing fluid flow to the sump. This decreases the fluid flow and output pressure through aperture 46. The output pressure will increase or decrease in relation to the amount of current t the solenoid coil 26.

Figure 5:
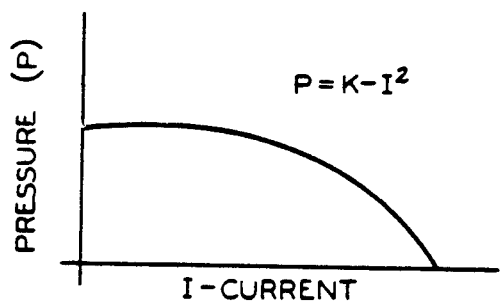
FIG. 5 is a qualitative curve illustrating the output pressure/current performance of the FIG. 1 embodiment.

Furthermore, the spring 66 applies a force to bias the valve plate 54 toward the face of the valve seat 61, opposing the primary balancing force due to pressure on the valve plate 54, such that a predetermined amount of current is required in the solenoid coil 26 to move the valve plate 54 and armature 20 away from valve seat. This biases the operation of the device 10 about low currents and, subsequently, above the low force levels associated with low currents. Adjustment of the spring 66 can be accomplished by rotating the rod 68 and moving it axially to set the bypass pressure for a predetermined current level. In the device 10, the output pressure varies with the current (qualitatively as shown in FIG. 5) such that, for example, at zero amperes of current, the output pressure is 100 psi, and at 1.0 ampere of current, the output pressure is zero psi. However, the output pressure-to-current performance may be varied by design.

Figure 2:
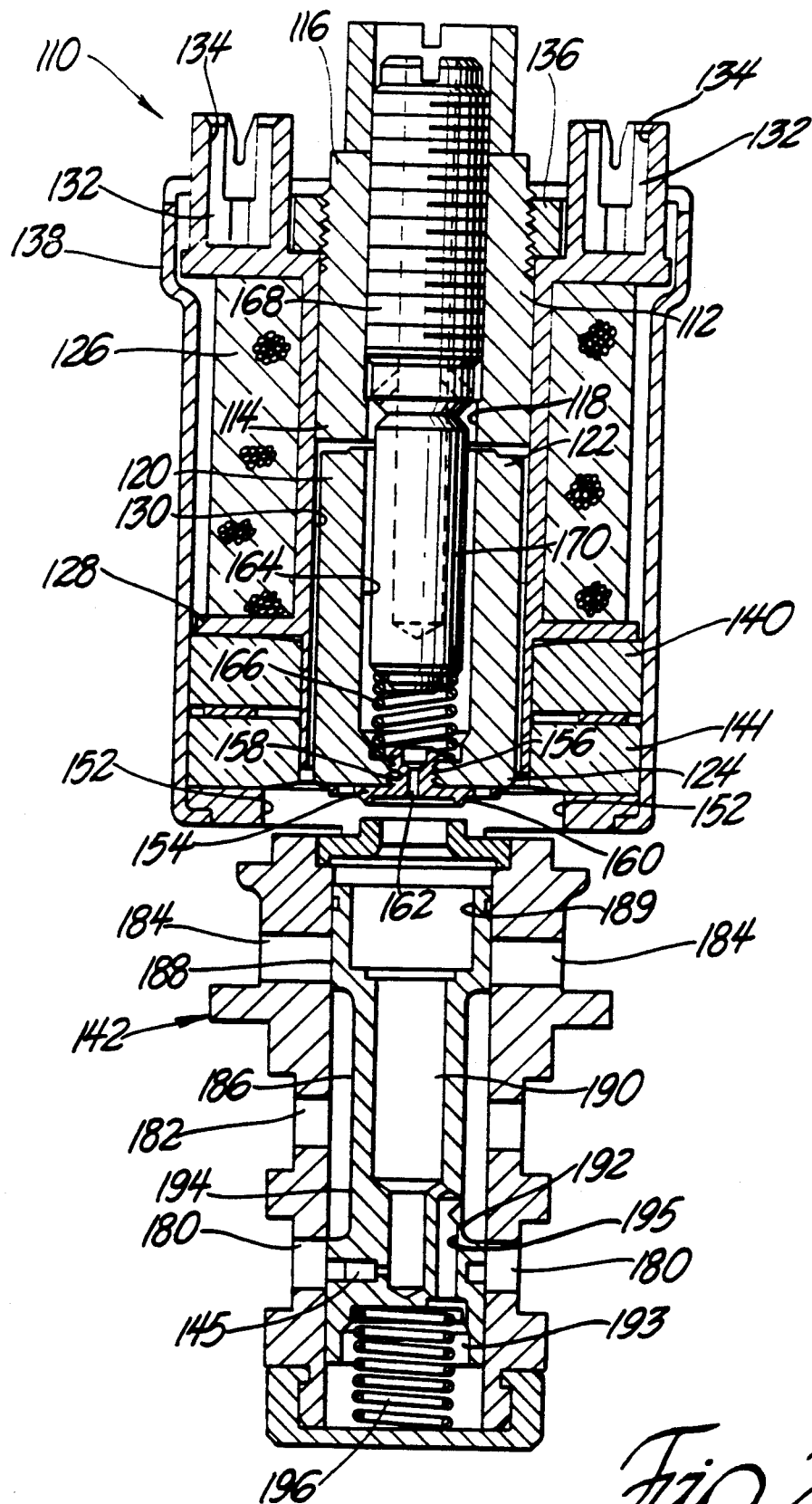
FIG. 2 is a cross sectional elevational view of a two-stage embodiment of the present invention.

A two-stage embodiment of the present invention is generally shown at 110 in FIG. 2, wherein elements or details which are like or similar to those of the FIG. 1 embodiment have like reference numerals increased by 100 (one hundred). The embodiment 110 is generally similar in construction to the single-stage embodiment 10 of FIG. 1. In the embodiment 110, the stationary member or pole piece means 112 and armature 120 are similar to those of the embodiment 10.

The device 110 further includes a valve housing, generally indicated at 142, having one or more apertures in the valve housing 142 to allow a fluid medium to enter and exit the valve housing 142, as well as exit in the vicinity of the armature 120. Specifically, a first aperture 180 is formed in the valve housing 142 to allow the fluid medium to enter the valve housing 142. Second aperture means 182 formed in the valve housing 142 allows the fluid medium to exit the valve housing 142. Third aperture means 184 is formed in the valve housing 142 to allow fluid to exit the valve housing 142 and flow back to the sump (not shown).

The device 110 further includes a flow valve means moving independently of the armature 120. The flow valve means is similar to that disclosed in copending application, U.S. Ser. No. 07/066,693, entitled "Transmission Pressure Regulator" of Ralph P. McCabe, which is hereby incorporated herein by reference. The flow valve means comprises a spool valve 186 having a first end 188 spaced axially from the closed end 124 of the armature 120. The first end 188 of the spool valve 186 includes a first cavity 189 formed therein. The spool valve 186 also includes a first internal passage 190 communicating with the first aperture 180 of the valve housing 142 via flow restriction means 145, and the first cavity 189 of the first end 188 to allow the fluid medium to flow from the first aperture 180 to the first cavity 189. The spool valve 186 also includes a second end 192 axially opposite the first end 188 and having a second cavity 193 formed therein. The spool valve 186 also includes an annular recessed portion 194 about the circumference thereof between the first end 188 and the second end 192 thereof. The spool valve 186 also includes a third internal passage 195 communicating with the annular recessed portion 194 and the second cavity 193 to control or move the spool valve 186 independently of the armature 120. A spring 196 may be disposed in the second cavity 193 to bias the spool valve 186 toward the armature 120 to reduce oscillations of the spool valve 186 due to fluid flow. The operation of the spool valve 186 is similar to that of spool valve 50 disclosed in the above-mentioned copending application while the operation of the bleed valve means 154 is similar to the FIG. 1 embodiment bleed valve means designated by the reference numeral 54.

Figure 3:
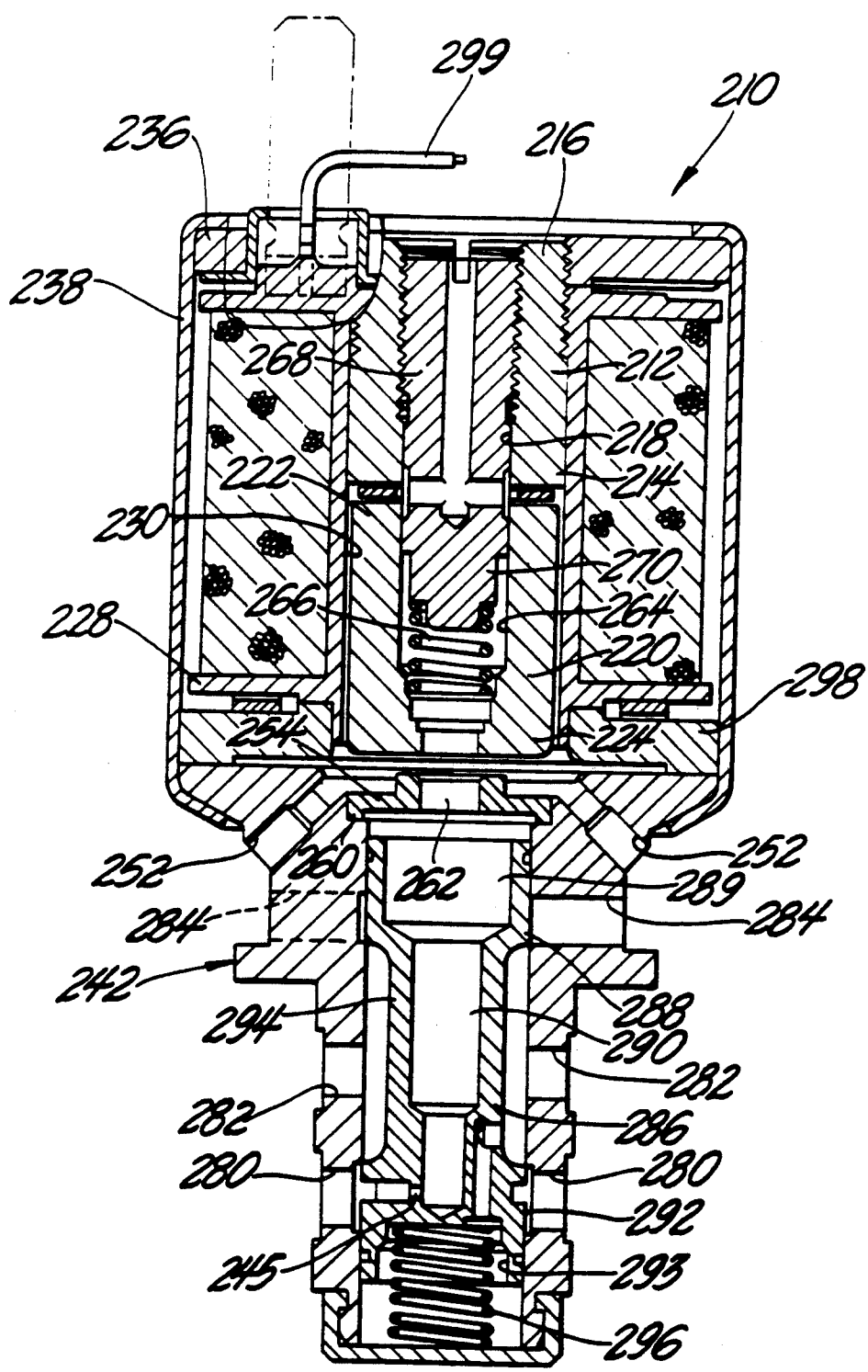
FIG. 3 is a cross sectional elevational view of an alternate two-stage embodiment of the present invention.

A first alternate two-stage embodiment of the present invention is shown at 210 in FIG. 3. The elements and/or detected FIG. 3 which are like or similar to either those of FIG. 1 or FIG. 2 embodiments are identified with similar reference numbers (the last two digits being the same as the two-digit reference numbers in FIG. 1 or the same as the last two digits in the reference numbers of FIG. 2). The second alternate embodiment 210 is similar in construction to embodiment 110 of FIG. 2. The device 210 has the second internal passage 252 shown as extending diagonally outwardly of the valve housing 242 relative to the first internal passage 290. Also, the device 210 includes a flux return washer 298 and eliminates the connectors 32 of the device 10 and substitutes a terminal 299 leading from the coil 226. The operation of the device 210 is the same as that of the device 110.

Figure 4:
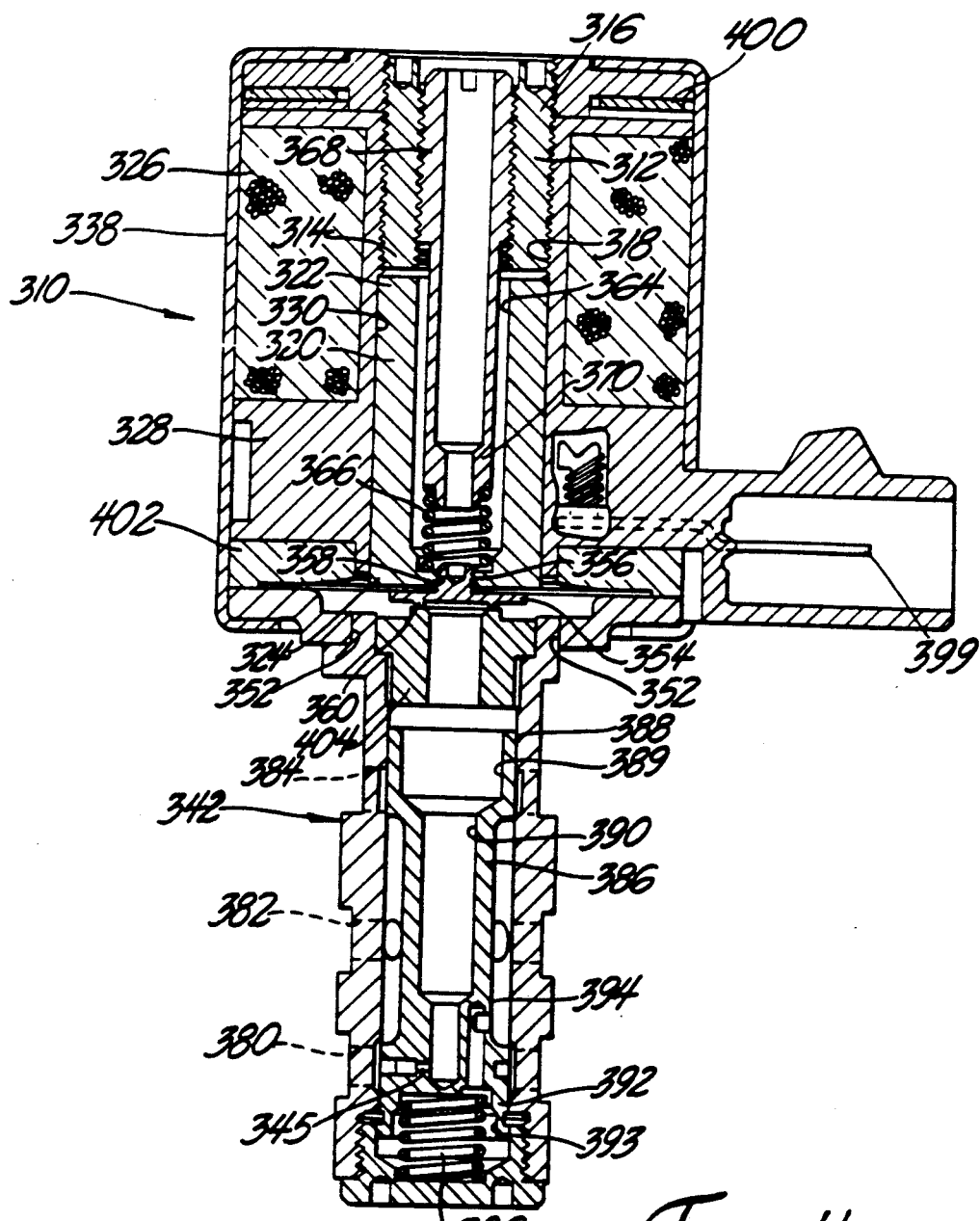
FIG. 4 is a cross sectional elevational view of a second alternative two-stage embodiment of the present invention.

FIG. 4 illustrates a second alternate two-stage embodiment 310 of the device 110, like parts of the FIG. 2 and FIG. 3 first alternate two-stage embodiment again being identified with similar reference numerals. The device 310 includes a pole washer 400 at one end of the bracket member 328 and a flux return washer 402 at the other end of the bracket member 328. The device 310 also includes a valve seat 404 disposed within the valve housing 342 with which the valve plate 354 cooperates. Again, the operation of the device 310 is generally the same as that of the device 110.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A pressure regulating assembly for regulating the pressure of a flowing fluid medium, comprising housing means, said housing means comprising a first housing portion and a second housing portion, electrical field coil means carried by said first housing portion, pole piece means situated generally within said field coil means, a valve seat, fluid-flow passage means formed through said valve seat, said pole piece means comprising a pole piece annular axial end face portion, armature means at least partly situated generally within said field coil means, said armature means comprising an armature annular axial end face portion, wherein said armature means is axially situated between said pole piece means and said valve seat as to thereby cause said armature annular axial end face portion to be juxtaposed to said pole piece annular axial end face portion, resilient means normally resiliently urging said armature means in a direction away from said pole piece means and toward said valve seat as to thereby terminate the flow of said fluid medium out of said fluid-flow passage means, wherein said second housing portion comprises a generally cylindrical inner chamber, spool valve means situated in said cylindrical inner chamber and movable with respect to said cylindrical inner chamber and relatively movable with respect to said armature means, said spool valve means comprising at least first and second diametrically relatively large and generally cylindrical valving portions engaging the surface of said cylindrical inner chamber, said spool valve means further comprising generally axially extending body means situated between and operatively interconnecting said first and second cylindrical valving portions, said generally axially extending body means being diametrically relatively small as to thereby define an annular chamber circumferentially between said axially extending body means and said cylindrical inner chamber wherein said annular chamber is also axially confined between said first and second generally cylindrical valving portions, first fluid passage means formed in said second housing portion at a location as to be generally juxtaposed to said first generally cylindrical valve portion for general control by said first valving portion, second fluid passage means formed in said second housing portion at a location as to communicate with said annular chamber, third fluid passage means formed in said second housing portion at a location as to be generally juxtaposed to said second generally cylindrical valving portion for general control by said second valving portion, fourth fluid passage means communicating between said first fluid passage means and said fluid-flow passage means formed through said valve seat, wherein when said armature means is moved as to terminate flow of said fluid medium out of said fluid-flow passage means formed through said valve seat the pressure of said fluid medium causes said spool valve means to move in a direction whereby said second valving portion at least further restricts flow of said fluid medium from said annular chamber and through said third fluid passage means toward sump and said first valving portion reduces its restrictive effect to flow of said fluid medium through said first fluid passage means and into said annular chamber and out of said second fluid passage means to associated structure to be acted upon by said fluid medium, wherein when said flow of said fluid medium out of said fluid-flow passage means is terminated by said armature means said resilient means is effective to maintain said armature means in position to continue termination of flow of said fluid medium against the force of the fluid pressure of said fluid medium tending to move said armature means away from said valve seat, and wherein said armature means moves away from said valve seat and against said resilient means only upon said field coil means being electrically energized with the extent of the movement of said armature means away from said valve seat being related to the magnitude of the electrical current supplied to said field coil means, and wherein when said armature means moves away from said valve seat said fluid medium is permitted to flow out of said fluid-flow passage means and toward sump.

2. A pressure regulating assembly according to claim 1 wherein said armature means comprises first and second axial ends, wherein said first axial end comprises said armature annular axial end face portion, and further comprising a valving member carried by said second axial end and movable in unison with said armature means, said valving member when moved by said armature means against said valve seat being effective to terminate flow of said fluid medium out of said fluid-flow passage means and toward sump.

3. A pressure regulating assembly according to claim 1 and further comprising adjustment means for selectively adjusting said resilient means as to thereby selectively adjust the resilient pre-load force exerted by said resilient means on said armature means to thereby selectively determine said magnitude of said electrical current necessary to bring about movement of said armature means away from said valve seat.

4. A pressure regulating assembly according to claim 3 wherein said adjustment means comprises an axially threadably adjustable spring seat member operatively engaging said resilient means.

5. A pressure regulating assembly according to claim 1 wherein said fourth fluid passage means is formed in said spool valve means.

6. A pressure regulating assembly according to claim 1 wherein the pressure of said fluid medium in said fluid-flow passage means is continually applied to said second cylindrical valving portion in a direction at least tending to move said spool valve means generally in the direction in which said first cylindrical valving portion is disposed.

7. A pressure regulating assembly according to claim 1 and further comprising second resilient means, said second resilient means being operatively connected to said spool valve means as to continually resiliently urge said spool valve means in the relative direction in which said second cylindrical valving portion is disposed.

8. A pressure regulating assembly according to claim 1 wherein said cylindrical inner chamber extends axially beyond said first cylindrical valving portion as to form an end chamber means, and further comprising fifth fluid passage means communicating between said annular chamber and said end chamber means.

9. A pressure regulating assembly according to claim 1 wherein said fourth fluid passage means comprises calibrated fluid flow restriction means.

10. A pressure regulating assembly according to claim 4 wherein said fourth fluid passage means is formed in said spool valve means.

11. A pressure regulating assembly according to claim 4 wherein the pressure of said fluid medium in said fluid-flow passage means is continually applied to said second cylindrical valving portion in a direction at least tending to move said spool valve means generally in the direction in which said first cylindrical valving portion is disposed.

12. A pressure regulating assembly according to claim 4 and further comprising second resilient means, said second resilient means being operatively connected to said spool valve means as to continually resiliently urge said spool valve means in the relative direction in which said second cylindrical valving portion is disposed.

13. A pressure regulating assembly according to claim 4 wherein said cylindrical inner chamber extends axially beyond said first cylindrical valving portion as to form an end chamber means, and further comprising fifth fluid passage means communicating between said annular chamber and said end chamber means.

14. A pressure regulating assembly according to claim 4 wherein said fourth fluid passage means comprises a calibrated fluid flow restriction means.

15. A pressure regulating assembly according to claim 10 wherein the pressure of said fluid medium in said fluid-flow passage means is continually applied to said second cylindrical valving portion in a direction at least tending to move said spool valve means generally in the direction in which said first cylindrical valving portion is disposed.

16. A pressure regulating assembly according to claim 10 and further comprising second resilient means, said second resilient means being operatively connected to said spool valve means as to continually resiliently urge said spool valve means in the relative direction in which said second cylindrical valving portion is disposed.

17. A pressure regulating assembly according to claim 10 wherein said cylindrical inner chamber extends axially beyond said first cylindrical valving portion as to form an end chamber means, and further comprising fifth fluid passage means communicating between said annular chamber and said end chamber means.

18. A pressure regulating assembly according to claim 10 wherein said fourth fluid passage means comprises calibrated fluid flow restriction means.

19. A pressure regulating assembly according to claim 11 and further comprising second resilient means, said second resilient means being operatively connected to said spool valve means as to continually resiliently urge said spool valve means in the relative direction in which said second cylindrical valving portion is disposed.

20. A pressure regulating assembly according to claim 11 wherein said cylindrical inner chamber extends axially beyond said first cylindrical valving portion as to form an end chamber means, and further comprising fifth fluid passage means communicating between said annular chamber and said end chamber means.

21. A pressure regulating assembly according to claim 11 wherein said fourth fluid passage means comprises calibrated fluid flow restriction means.

22. A pressure regulating assembly according to claim 19 wherein said cylindrical inner chamber extends axially beyond said first cylindrical valving portion as to form an end chamber means, and further comprising fifth fluid passage means communicating between said annular chamber and said end chamber means.

23. A pressure regulating assembly according to claim 19 wherein said fourth fluid passage means comprises calibrated fluid flow restriction means.

24. A pressure regulating assembly according to claim 22 wherein said fourth fluid passage means comprises calibrated fluid flow restriction means.

25. A pressure regulating assembly according to claim 2 wherein said cylindrical inner chamber and said spool valve means are in general axial alignment with said armature means.

26. A pressure regulating assembly according to claim 24 wherein said cylindrical inner chamber and said spool valve means are in general axial alignment with said armature means.

27. A pressure regulating assembly according to claim 1 and further comprising second resilient means, said second resilient means being operatively connected to said spool valve means as to continually resiliently urge said spool valve means in the relative direction in which said second cylindrical valving portion is disposed, wherein said cylindrical inner chamber extends axially beyond said first cylindrical valving portion as to form an end chamber means, wherein said second resilient means is at least in part situated in said end chamber means, and further comprising fifth fluid passage means communicating between said annular chamber and said end chamber means.

28. A pressure regulating assembly according to claim 1 wherein said armature means comprises first and second axial ends, wherein said first axial end comprises said armature annular axial end face portion, and further comprising additional fluid passage means extending through said second axial end of said armature means, and wherein said additional fluid passage means is effective for conveying a portion of said fluid medium as flows through said fluid-flow passage means to space existing in and about said armature means.

29. A pressure regulating assembly according to claim 28 wherein said additional fluid passage means comprises calibrated fluid flow restriction means.

30. A pressure regulating assembly according to claim 1 wherein said armature means comprises a cup-like configuration having a generally axial end wall means and a cylindrical wall extending axially therefrom having an open end and defining an inner space generally radially confined by said cylindrical wall, wherein said axial end wall means is disposed as to be juxtaposed to said valve seat, and further comprising additional fluid passage means extending through said axial end wall means and communicating with said inner space, said additional fluid passage means being effective to convey a portion of said fluid medium as flows through said fluid-flow passage means to said inner space and from said inner space to such additional space as exists between said armature means and said electrical field coil means.

31. A pressure regulating assembly according to claim 30 wherein said additional fluid passage means comprises calibrated fluid flow restriction means.

32. A pressure regulating assembly according to claim 2 and further comprising additional fluid passage means extending through said valving member, wherein said additional fluid passage means comprises calibrated fluid flow restriction means, and wherein said additional fluid passage means is effective for conveying a portion of said fluid medium as flows through said fluid-flow passage means to space existing in and about said armature means.

* * * * *